RUGGED-DUTY MASTER-SLAVE MANIPULATOR

Filed Dec. 11, 1961 12 Sheets-Sheet 1

RUGGED-DUTY MASTER-SLAVE MANIPULATOR

Filed Dec. 11, 1961

July 7, 1964 D. G. JELATIS ETAL 3,139,990

RUGGED-DUTY MASTER-SLAVE MANIPULATOR

Filed Dec. 11, 1961 12 Sheets-Sheet 3

July 7, 1964 D. G. JELATIS ETAL 3,139,990

RUGGED-DUTY MASTER-SLAVE MANIPULATOR

Filed Dec. 11, 1961 12 Sheets-Sheet 4

July 7, 1964 D. G. JELATIS ETAL 3,139,990

RUGGED-DUTY MASTER-SLAVE MANIPULATOR

Filed Dec. 11, 1961 12 Sheets-Sheet 6

July 7, 1964 D. G. JELATIS ETAL 3,139,990

RUGGED-DUTY MASTER-SLAVE MANIPULATOR

Filed Dec. 11, 1961 12 Sheets-Sheet 7

RUGGED-DUTY MASTER-SLAVE MANIPULATOR

Filed Dec. 11, 1961 12 Sheets-Sheet 9

United States Patent Office 3,139,990

Patented July 7, 1964

3,139,990

RUGGED-DUTY MASTER-SLAVE MANIPULATOR

Demetrius G. Jelatis, Robert A. Olsen, Lester W. Haaker, and Elmer W. Pearson, all of Red Wing, Minn., assignors to Central Research Laboratories, Inc., Red Wing, Minn., a corporation of Minnesota Filed Dec. 11, 1961, Ser. No. 158,396

18 Claims. (Cl. 214—1)

This invention relates to a rugged-duty, remote control, master-slave manipulator of the type which is used by an operator to perform certain manipulative functions in some area remote from the operator as, for example, on the opposite side of a shielding wall. Such manipulators are well known and widely used. Exemplary manipulators of this general type are shown in United States Patent No. 2,764,301, issued on September 25, 1956, to Goertz et al., and United States Patent No. 2,771,199, issued on November 20, 1956, to Jelatis. This type of manipulator has become standard for through-the-wall installations. They have proven highly satisfactory when used for those purposes for which they are designed. These purposes are essentially the performance of relatively light work.

A need has arisen for manually operable remote control master-slave manipulators having heavy duty or rugged-duty capabilities without significant loss of dexterity for performing delicate operations. The rugged-duty manipulator of the present invention is designed to meet this need for increased range of usefulness. It incorporates novel features including increased strength, rigidity, and wear resistance, increased gear ratios and greatly increased load capacity. The rugged duty manipulator according to the present invention includes a mechanical, automatically shifting, dual ratio, tong-squeeze drive at the end of the master arm of the manipulator which closes the tongs at the end of the slave arm rapidly to contact an object and then shifts to provide an increased squeeze force. The present manipulator is the result of a coordinated design including these and other features which produce a manipulator of truly amazing capabilities.

The principal object of the present invention is to provide a new rugged-duty, remote control, master-slave manipulator of high load capabilities.

Another object of this invention is to provide a remote control master slave manipulator of increased strength, rigidity, wear resistance and load capacity.

A still further object of this invention is to provide a rugged-duty remote control manipulator having an automatically shifting dual ratio, tong-squeeze drive to provide force multiplication in the tongs.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which.

GENERAL ASSEMBLY

Figure 3:
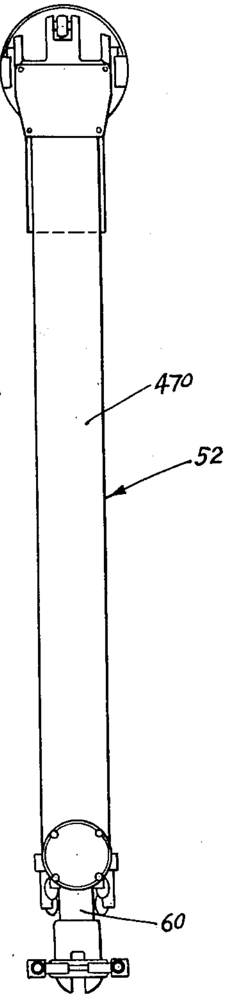
FIGURE 3 is an elevation (viewed from the remote area) of the slave arm of the manipulator.

*(FIGURES 1, 2 and 3)*

Figure 1:
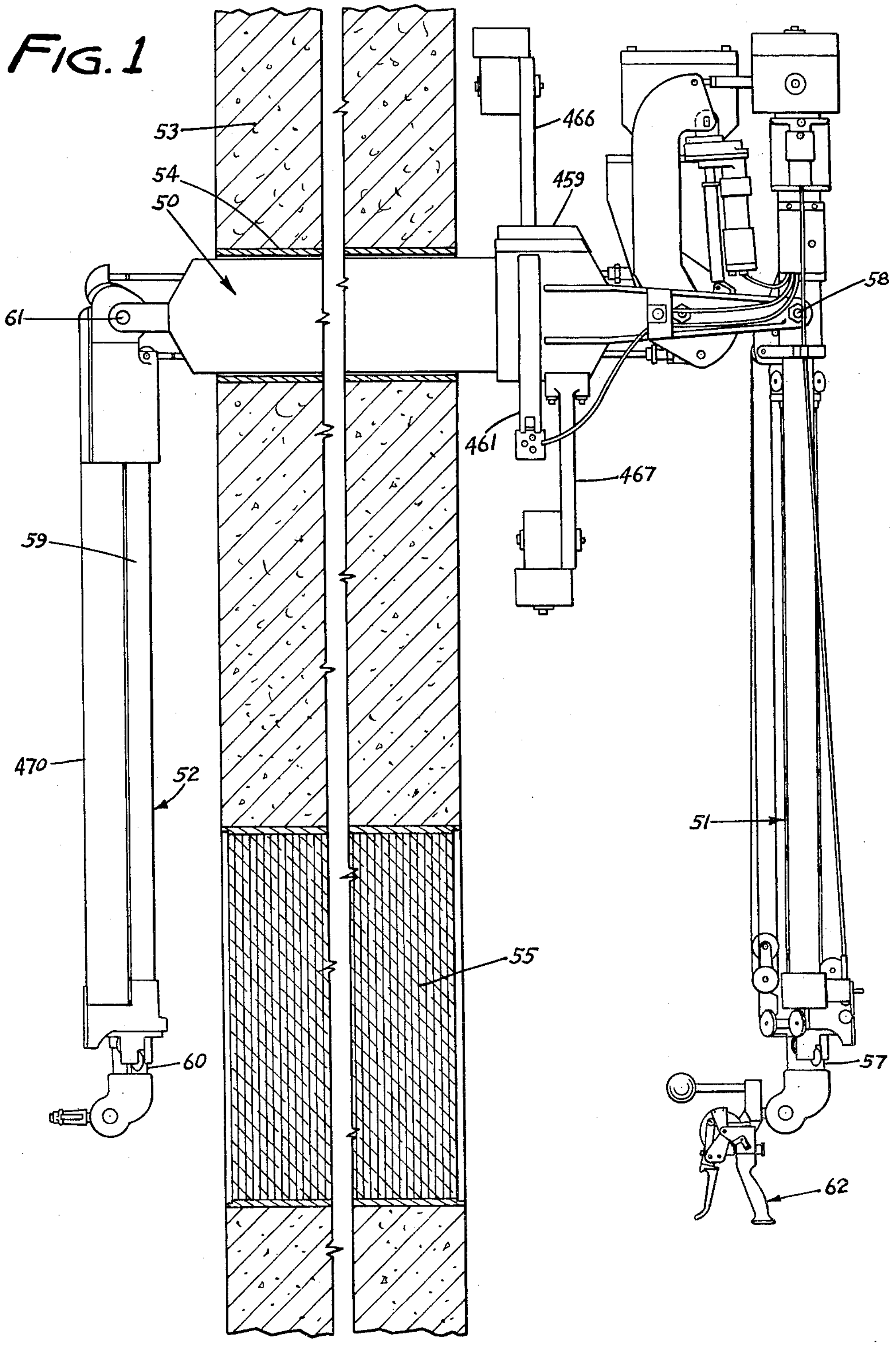
FIGURE 1 is a left hand side elevation (from the viewpoint of the operator) partly in section, showing the rugged-duty master-slave manipulator of the present invention mounted in a shielding wall.

Referring now to the drawings and particularly to FIGURE 1, the rugged-duty, remote control manipulator of the present invention comprises generally a horizontal tubular support or through tube 50, a master arm 51 and a slave arm 52. The horizontal support 50 extends through a generally vertical shielding wall 53 being mounted therein in a sleeve or tube 54 set in the wall. As is well understood, the thickness of the wall and the material of which it is composed will depend upon the shielding purpose of the wall. The wall is provided with a window 55 through which the operator in a safe area to the right of the wall may observe the manipulative movements of the slave arm in the dangerous area or hot cell to the left of the wall.

For convenience in describing the present invention, insofar as possible, the same numbering system is employed to designate corresponding parts as used in the aforesaid Goertz et al. and Jelatis patents to which the apparatus of the present invention is related. The subject matter of those patents is incorporated herein by reference to the extent that might be necessary to fully understand that structure and those movements held in common between the present rugged-duty manipulator and those of the prior patents, and, therefore, not repeated in this application.

The master arm 51 comprises a dual-tubular trunk tube 56 which is stationary so far as relative vertical movement is concerned but is pivotally connected at 58 to the horizontal support. The master arm also includes a movable boom tube part 57 which is slidable longitudinally relative to the trunk tube portion to move toward and away from the pivot. Similarly the slave arm 52 comprises a tubular trunk tube portion 59 which is stationary relative to vertical movement and a movable boom tube portion 60. The slave arm trunk tube portion 59 is pivotally connected at 61 to the horizontal support and the movable boom tube portion 60 is mounted for longitudinal movement toward and away from the pivot. A handle 62 at the lower end of the master arm boom tube is engaged by the hand of the operator and by appropriate movements which are transmitted along the arm 51 and the support 50 and arm 52 controls the movement of a claw or tong 63 connected to the lower end of the boom tube of the slave arm 52.

AUTOMATICALLY SHIFTING DUAL RATIO HANDLE (*FIGURES 4 to 10*)

In FIGURES 4 through 10 there is shown the details of construction of the modified handle means 62 of the manipulator of the present invention. This handle which functions as a tong-squeeze drive is adapted to quickly close the tongs at the end of the slave arm to contact an object to be manipulated and then automatically shift to provide an increased squeeze force. The handle 62 includes a body portion 300 having a depending pistol-type hand grip 301. A bracket portion 302 extending upwardly from the handle body 300 is provided with a deep recess 303 adapted to receive the shank of bevel gear 99 extending from wrist joint housing 65 to attach the handle to the end of the master arm boom tube. The handle is secured by suitable fastening means such as screws 304.

For a purpose to be described in greater detail hereinafter, bracket 302 includes a further recess 305 adapted to receive lever 306 which carries a control ball handle 307 at its opposite end. Lever 306 is secured in recess 305 of bracket 302 by suitable fastening means such as screw 308.

Attached to the left side of handle body 300 is a left side plate 309 and attached to the opposite side of the handle body is a right side plate 310. Both side plates are rigidly secured and project forwardly from the body. A shaft 311 is supported between the side plates. Secured to shaft 311 between the side plates to pivot with the shaft is a pulley housing 312 and a housing cover 313 attached thereto. Mounted between the pulley housing wall and the housing cover to rotate together relative to shaft 311 are a pinion 314, tong cable pulley 315 and a ratchet wheel 316.

A further shaft 317 is supported between pulley housing 312 and housing cover 313. A connecting link 318 is secured to shaft 317 for pivotal movement therewith. A gear rack 319 is pivotally connected at 320 to the end of link 318. Rack 319 engages pinion 314 on shaft 311. The rack is maintained in engagement with the pinion by means of a cantilevered roller 321 on the inside wall of housing cover 313. A finger lever 322 is secured to the hub of connecting link 318 to permit finger movement of the manipulator operator to pivot link 318 on shaft 317 and, by engagement of pinion 314 by gear rack 319, to cause rapid rotation of cable pulley 315 so as to quickly close the tong means at the end of the slave arm into contact with an object to be grasped.

The pulley housing 312 and housing cover 313 and mechanism enclosed and supported thereby are all mounted to pivot with shaft 311 between the sideplates 309 and 310. For greater rigidity of this structure, and to provide a stop for finger lever 322, a spacer 323 is provided in the lower portion of the cable pulley housing between the housing wall and housing cover. One end of a plunger 324 is pivotally supported on a shaft 325 between the pulley housing wall and housing cover. Plunger 324 is maintained centered on the shaft by means of a spacer 326 on one side and a narrower spacer 327 and spring 328 on the other. About midway along its length plunger 324 is provided with a shoulder 329. A coil spring 330 extends around the free end of the plunger and bears against shoulder 329. The opposite end of spring 330 is received in a threaded retainer thimble 331 threadedly received in handle body 300 to provide for manual adjustment of the tension on coil spring 330.

A cantilevered shaft 332 extends into the pulley housing through a stop 333 cast into the exterior wall of the pulley housing 312. Stop 333 cooperates with a notch 334 in the right side plate 310 to limit movement of the pulley housing. Shaft 332 carries a cam 335 immediately adjacent the inside wall of the pulley housing and a pawl 336 positioned to engage the teeth of ratchet wheel 316 when a predetermined resistance is met by the tong assembly at the end of the slave arm. The movement of cam 335 is limited by virtue of a pin 337 extending outwardly from the cam wall and movable in a slot 338 in the wall of pulley housing 312. Movement of pawl 336 is similarly limited by virtue of a pin 339 extending outwardly from the side of the pawl through an opening 340 of larger diameter in the wall of pulley housing 312. One arm of spring 328 bears against pin 339 to urge pawl 336 into engagement with ratchet 316 except when urged out of engagement by virtue of the lower edge of the horizontal portion of the right side plate 310 bearing against the pin against the pressure of the spring. The bottom edge surface of the horizontal portion 341 of a bell crank arm 342 bears against the top edge surface of cam 335.

The bell crank return arm 342 is pivotally mounted within the handle body for rotation about shaft 343. The bell crank arm 342 is eccentrically mounted with respect to the pivot shaft. It has a generally vertical portion 344 at the end of which a bifurcated retainer 345 is pivotally attached. In the shank 346 of the retainer 345, between the arms 347 and 348 thereof, there is provided a deep recess 349 into which is fitted a coil spring 350. A plunger 351 having a shoulder at one end is fitted within coil spring 350. An eccentric cam 352 is fitted between the arms 347 and 348 of retainer 345 and mounted on the outside surface of the handle body for rotary movement by virtue of rotation of knob 353. Cam 352 bears against plunger 351 and coil spring 350.

As the eccentric is rotated to exert greater pressure against the plunger 351 and coil spring 350, retainer 345 is pushed forward. By virtue of the pivotal connection between the shank 346 of the retainer and the vertical portion 344 of the return arm 342, the vertical portion of the return arm is pushed forward causing the return arm to pivot on shaft 343 and push the horizontal portion 341 of the return arm downwardly against cam 335. In this manner the amount of tension exerted by the tongs at the end of the slave arm to cause the squeeze drive of the handle to automatically shift to provide an increased squeeze force can be readily adjusted by the operator.

In normal operation the operator grasps the handle in his hands with his fingers engaging the finger lever 322 and his palm and thumb engaging the hand grip 301. As pressure is exerted against the finger lever crank 322, link 318 is caused to pivot about shaft 317. As the grip is tightened gear rack 319 is pulled forward in engagement with pinion 314. As pinion 314 is rotated about shaft 311 the tong cable pulley 315 mounted for movement with the pinion is also caused to rotate about the same shaft. Rotation of the tong cable pulley causes cable 107 to be wound about the periphery of the pulley exerting a pull upon the cable which is transmitted through the wrist joint up through the master arm, through the horizontal support 50, and down through the slave arm and slave arm wrist joint to the tongs 63 which are then caused to close.

Slow movement of the finger lever causes rapid rotation of the cable pulley and corresponding rapid closing of the tongs. Assuming that the object to be grasped between the tongs is a rigid or heavy object which is desired to be tightly gripped, the automatic shifting feature of the handle then comes into play. As the tongs close about the object and resistance is encountered equal to a predetermined force selected by rotation of knob 353, the handle automatically shifts from rapid rotation of the cable pulley by virtue of movement of the gear rack and pinion through movement of the finger lever about its pivot shaft 317. Instead, when resistance is encountered equal to the predetermined force, the gear rack no longer moves relative to pinion 314. Thus, when further pressure is exerted by the fingers upon the finger lever pivotal movement about shaft 317 is no longer possible. As a result, the pressure against the finger lever is transmitted to the pulley housing and, as further pressure is applied to the finger lever, that lever and the pulley housing pivot together about shaft 311. As this occurs and the finger lever is drawn backwardly toward the hand grip, cam 335 is caused to rotate and lift the horizontal arm portion 341 of the bell crank return arm 342, which bears against the top of the cam. This causes rotation of crank arm 342. As the return arm 342 is rotated, pivoted about shaft 343 by the lifting of the horizontal portion 341 of the arm, spring 328 lifts pin 339 to lift pawl 336 into engagement with ratchet wheel 316. Thus, as continued finger pressure is exerted against the finger lever, further rotation of cable pulley 315 is now by virtue of pawl 336 moving with the pulley housing relative to the handle body and forcing the ratchet wheel to rotate about shaft 311. Since the cable pulley is mounted for movement with the ratchet wheel, the tong cable continues to be wrapped about the pulley but at a slower rate and moving through shorter distances. This enables the operator to exert an increased tight squeeze force on the object being grasped. Since the handle now pivots about the same shaft as the cable pulley the rate of rotation of the pulley is the same as that of the finger lever.

The force exerted by spring 330 against pulley housing 312 is greater than the force exerted by friction in the handle and tong system so as to permit initial rapid moving of the finger lever and corresponding initial rapid closing of the tongs. The force exerted by spring 330 is less than the predetermined resistance force which causes automatic shifting to the direct tong squeeze drive.

In order that the tight squeeze exerted manually by the operator upon the objects to be manipulated may be maintained without continuous exertion of pressure by the operator a ratchet locking means for the handle is provided as follows. A pawl 354 is secured to shaft 343 for movement therewith. Pawl 354 is positioned within the handle body so as to be movable into and out of engagement with the teeth of ratchet wheel 316. A latch 355 external of the handle body is also secured to shaft 343 to permit the operator to rotate the pawl into or out of engagement with the ratchet.

Pawl 354 is spring loaded by virtue of a coil spring 356 positioned in a deep recess 357 in the interior of the handle body and exerting pressure against a plunger 358 which engages the edge of pawl 354 in both engaged and disengaged positions. Thus, if the operator wishes to secure a tight grip on a heavy object he simply rotates the latch 355 so as to rotate pawl 354 into locking engagement with ratchet 316. Then, even though the grip of the hand on the hand grip and finger lever of the handle may be relaxed the squeeze of the tong on the article to be manipulated is maintained. The operator can exert an increasingly tight squeeze force by pumping the finger lever and each increment of the tightened squeeze is maintained by the pawl.

The pawl and ratchet locking mechanism further assists the operator by relieving him of the necessity of maintaining constant pressure of the handle grip in order to retain the article being handle within the jaws of the tongs. This is of particular advantage where the article being handled is heavy. In this instance, the bulk of the weight of the article can be supported by the operator by means of the manual assist in the form of lever 306 and ball handle 307.

It will be noted that the ball handle 307 is supported forward from the wrist joint of the master arm a distance which corresponds generally to that by which the center of the jaws of the tongs extend forward from the wrist joint of the slave arm. This permits the operator to effectively exert a lifting force over the approximate center of gravity of the object being lifted. The operator can exert a lifting force with one hand leaving the other hand free to maneuver the handle of the manipulator through the required motions. The ball handle resting in the palm of one hand of the operator functions as a ball and socket universal joint facilitating easy maneuverability.

WRIST JOINTS

Figures 11, 12:
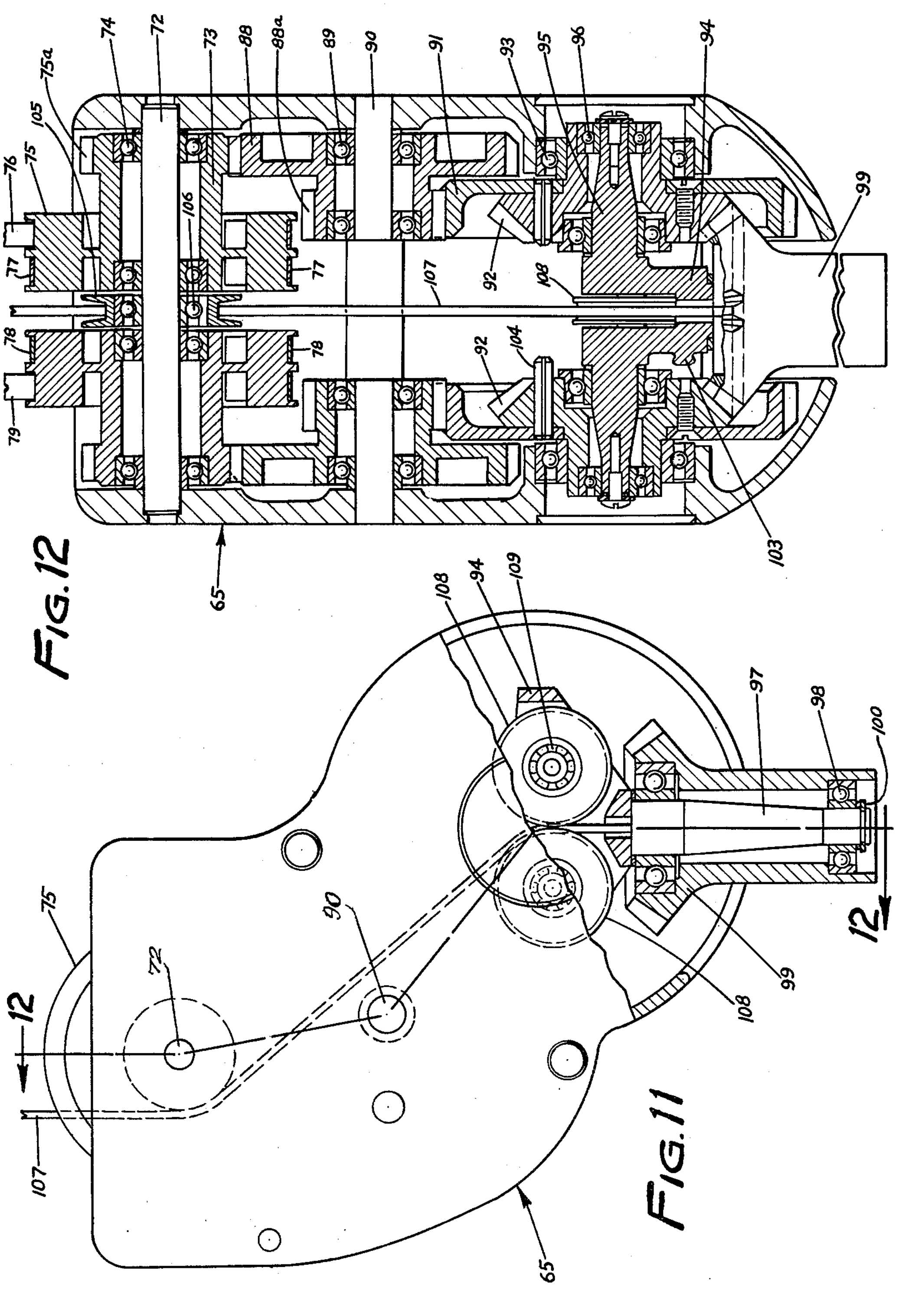
FIGURE 11 is a right hand elevation partly broken away and partly in section of a modified heavy duty wrist joint assembly.
FIGURE 12 is a section on the line 12—12 of FIGURE 11 and in the direction of the arrows.

(*FIGURES 11 and 12*)

In FIGURES 11 and 12 there is shown a modified and strengthened wrist joint by which the handle means 62 and the tong means 63 are mounted, respectively, on the lower ends of the master and slave arms to perform their manipulative functions. The wrist joint includes a housing 65 adapted to be secured to the lower ends of the master arm and slave arm boom tubes. The housing 65 is formed of complementary halves which are secured to one another by suitable fastening means, such as screws extending through openings in one housing half and threaded into the other housing half.

The opposite walls of the housing receive the ends of shaft 72 on which is mounted a pair of tubular members 73 by means of two pairs of ball bearings 74. Each tubular member 73 has a pair of take-up sections 75 and a spur gear section **75*a*. The four take-up sections 75 in the form of a grooved drum or pulley receive four metal tapes 76, 77, 78 and 79 which have their ends anchored in the take-up sections. These tapes transmit elevation and twist motions. Tapes 76 and 79 extend in one direction around the take-up members and tapes 77 and 78 are wrapped in opposite directions around the take-up members. The spur gear section 75*a* of the tubular members 73 mesh with idler gears 88 journaled by means of ball bearings 89 on shaft 90** supported in the housing.

Idler 88 is a compound gear designed to give a higher gear ratio. Idler 88 is provided with a spur gear section **88*a* of smaller diameter which in turn meshes with spur gears 91 which are secured to beveled differential gears 92 journaled by ball bearings 93 in the housing. A yoke 94 has trunnions 95 which are journaled in the differential gears 92 by means of two pairs of ball bearings 96. The yoke 94 also has a shaft 97 which by means of two ball bearings 98 journals a bevel gear 99 which is in mesh with the differential gears 92 whose gear ratio is approximately 1:1 in order to provide about equal stiffness in both the elevation and twist motions. The bevel gear 99** is held in mesh with the differential gears by means of a snap ring 100 which is at the lower side of the lower ball bearing 98.

Angular movement of the yoke 94 about the trunnions 95 is limited by means of the dimensions of the opening in the housing through which the shank of bevel gear 99 extends. The handle 62 or the tongs 63 is secured to the shank of the bevel gear. Integral peg or stop 103, which is cast into the yoke, lies in the path of peg 104 which is set in the differential gear 92. Engagement of the peg 104 with the stop 103 limits the angular movement of the differential gears 92 in both directions and, since the take-up sections 75 are geared to the differential gears 92, the angular movement of the take-up sections are limited, with corresponding limit of tape movement.

A guide pulley 105 is journaled on the shaft 72 by means of ball bearing 106 between the tubular members 73. The pulley 105 is engaged by tong cable 107 which extends thereover, being guided between two guide pulleys 108 journaled by ball bearings 109 on the yoke 94. The cable 107 extends from the pulleys 108 through the hollow shaft 97 of the yoke 94 to the cable pulley 315 of handle 62, in the case of the master arm wrist joint. The corresponding cable **107*a*** similarly extends from the slave arm wrist joint to operate the tong means, as more fully described hereinafter.

Because of the proportions of the take-up sections 75, the spur gear sections **75*a*, the idler gear sections 88 and 88*a*, the spur gears 91 and the differential gears 92, the tapes 76, 77, 78 and 79 move about five times as far as points on the pitch circles of the differential gears 92** and, thus, the load transmitted to the tapes is about ⅕ that imposed at the differential gears. The increased gear ratios of the wrist joint of the present manipulator introduces increased load carrying capabilities and, at the same time, results in increased rigidity. Rigidity is increased by a factor which is the square of the gear ratio.

MASTER TONG SQUEEZE MULTIPLIER

(*FIGURE 13*)

Figure 13:
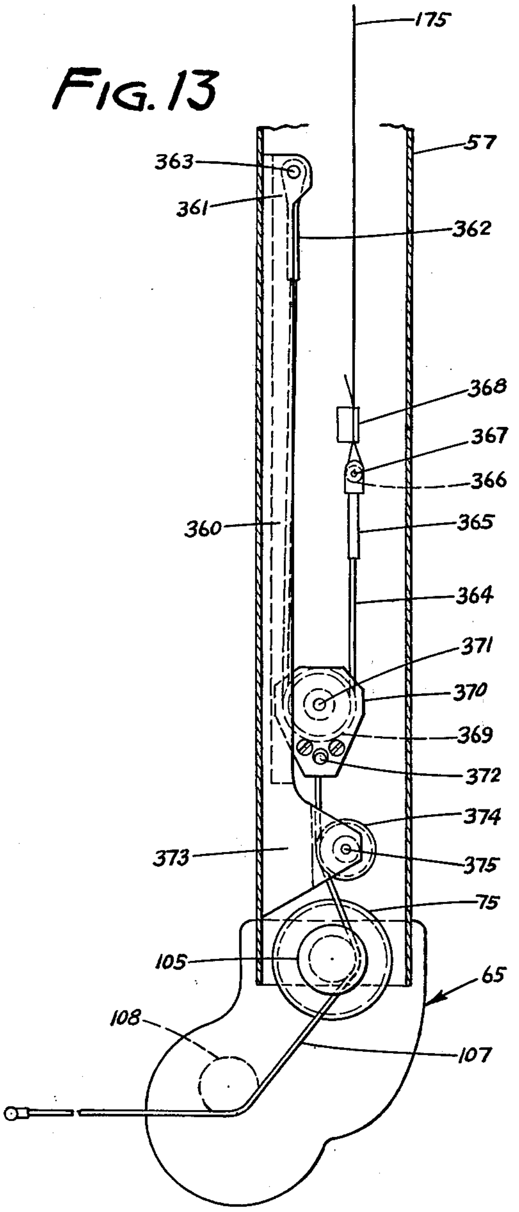
FIGURE 13 is a fragmentary left side elevation, partly in section, of the master arm boom tube with a tong squeeze multiplier assembly installed therein.

In FIGURE 13 there is shown details of an assembly installed in the master arm boom tube 57 by means of which a two times multiplication of the squeeze force applied by the handle is obtained. The master squeeze multiplier assembly includes an elongated bracket 360 secured to the inside wall of the master arm boom tube 57, centrally located along its forward edge. The top end 361 of the bracket is bifurcated to receive an eye end cable terminal 362 secured in place by means of a terminal shaft 363 extending through the arms of the top end of the terminal bracket. A cable 364 extends from the terminal 362 to a tape terminal 365 which is bifurcated at one end to receive a bushing 366 which is held in place by means of a pin 367. One end of tong-to-handle tape 175 is looped around bushing 366 and held by means of a tape clamp 368.

Cable 364 passes around a pulley 369 located in pulley block 370 and journaled to rotate about shaft 371. One end of tong cable 107 extending from the handle through the wrist joint is secured to block 370 by any suitable means, such as a swaged on ball shank 372 held in the block. The bottom end 373 of bracket 360 is also bifurcated to receive a cable guide pulley 374 journaled about a shaft 375. Pulley 374 is disposed centrally within the master arm boom tube 57 and guides cable 107 in its path from pulley 105 in the wrist joint to the pulley block 370 of the multiplier assembly.

It will be readily seen that, as cable 107 is caused to move a given distance by virtue of manipulation of the finger lever of handle 62, the tong-to-handle tape 175 will be caused to move a distance which is twice as great. Thus, the force transmitted by the tape 175 to the slave arm is decreased relative to the force applied by the operator to the handle means. This reduces the load exerted on the pulley banks throughout the manipulator and allows the use of thin flexible tape over small diameter pulleys. This also reduces the stretch in the tape resulting in a stiffer and more rigid system. The same results may be achieved by other means such as the use of a direct gear coupling between the ends of cable 107 and tape 175, leverage systems or other force multiplier means.

SLAVE ARM TONG SQUEEZE ASSEMBLY

(*FIGURE 14*)

Figure 14:
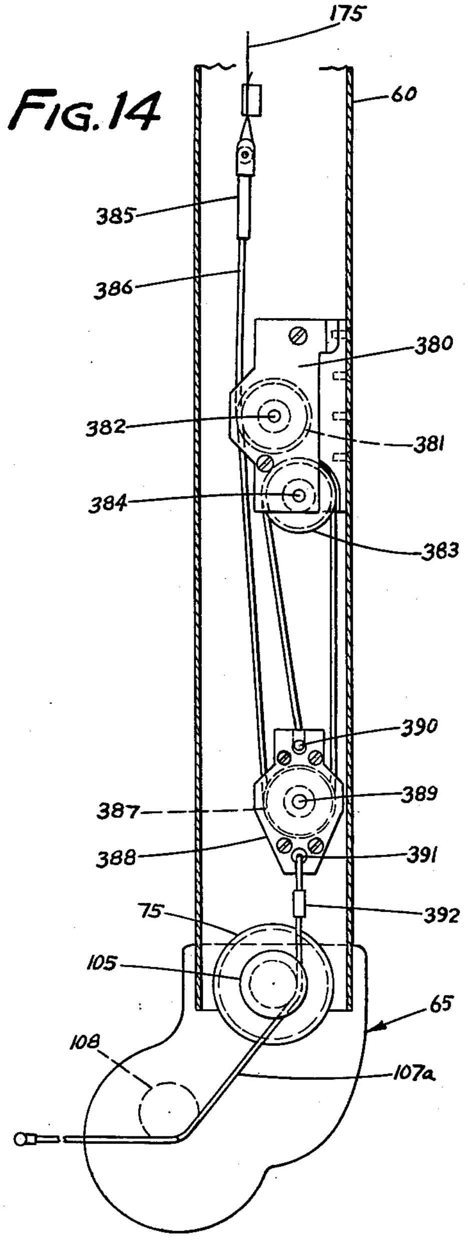
FIGURE 14 is a fragmentary left side elevation, partly in section, of the slave arm boom tube showing a tong squeeze multiplier assembly installed therein.

In FIGURE 14 there is shown the corresponding assembly by which the tong squeeze force transmitted to the slave arm by means of the tong-to-handle cable 175 is multiplied three times. This assembly includes a bracket 380 mounted centrally within the slave arm boom tube 60 along the edge nearest the shielding wall 53. The bracket 380 is bifurcated to receive pulleys 381 and 383 journaled to rotate on shafts 382 and 384, respectively, which are supported in the bracket. The slave arm end of tape 175 is secured to a tape terminal 385, of construction as already described.

Terminal 385 connects the tape to a cable 386 which is guided around pulley 381 to a pulley 387 located in a pulley block 388 and journaled to rotate about a shaft 389, and the cable thence passes over and around pulley 383 in bracket 380 and back to pulley block 388, to which the opposite end of the cable is securely attached at 390 by any suitable means. A loop of tong cable **107*a* is attached to the opposite or lower end of pulley block 388 at 391 and secured by means of a cable clamp in the form of a pressed-on sleeve 392. Cable 107*a* extends from the pulley block around pulley 105** in the slave arm wrist joint to the tong means.

It will be seen that, as tong-to-handle tape 175 is moved a given distance in response to manipulation of the finger lever of the handle by the operator, this movement is transmitted to cable 386 and, by virtue of the arrangement of pulleys, cable **107*a* is caused to move a distance which is one third as great. Thus, the reduced force transmitted by tape 175** from the master arm is multiplied in the slave arm and this increased force is transmitted to the tong means at the end of the slave arm. Other force multiplier means may similarly be used in the slave arm.

TONG ASSEMBLY

Figures 15, 16:
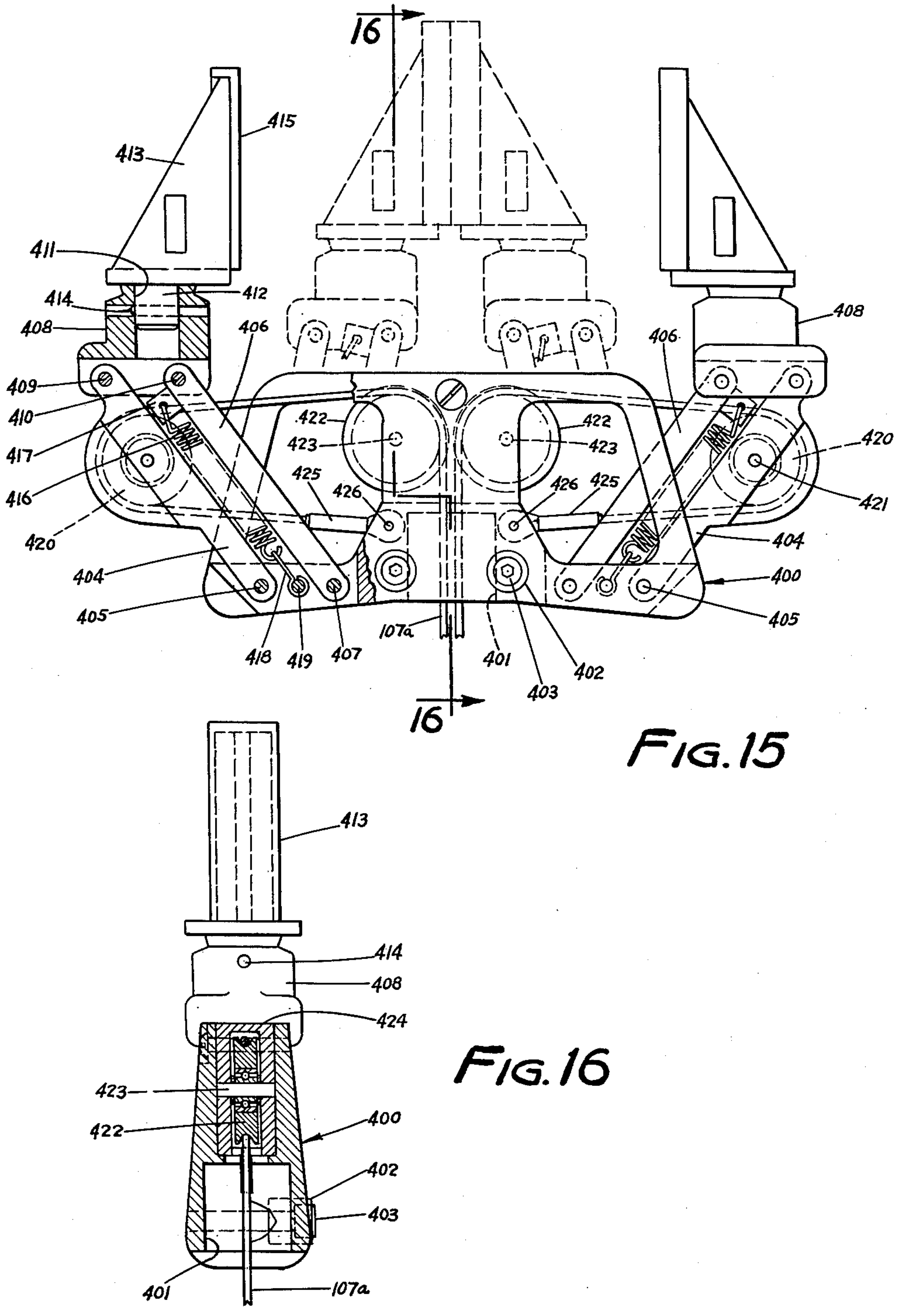
FIGURE 15 is a top plan view, partly broken away and partly in section, of a modified rugged duty tong assembly with multiplied squeeze force.
FIGURE 16 is a sectional view on the line 16—16 of FIGURE 15 and in the direction of the arrows.

(*FIGURES 15 and 16*)

Referring now to FIGURES 15 and 16 there is shown a modified rugged duty tong assembly for use with the manipulator of the present invention. The tong assembly includes a rugged tong body or frame indicated generally at 400, and preferably composed of stainless steel. One edge of the frame body includes a deep recess 401 adapted to receive the shank of bevel gear 99 of the slave arm wrist joint. The tong body is secured to the wrist joint by means of a pair of cylindrical wedge members 402 held in the frame by means of screws 403.

The tong assembly is generally symmetrical about an axis corresponding to the center line of the bevel gear. It includes compound link means including a pair of outer links 404 pivotally connected within the frame for movement about a pin 405 and a pair of parallel inner links 406 each spaced from the outer link and pivotally connected to the frame by means of pin 407. The opposite ends of links 404 and 406 are pivotally connected to a jaw socket element 408 by means of pins 409 and 410, respectively. The jaw socket elements 408 are provided with a recess 411 adapted to receive the shank 412 of jaw means 413. The jaw is held in the jaw socket by any suitable means, such as, for example, spring loaded ball detent 414.

A variety of different types of jaws may be used with the tong assembly depending upon the particular manipulation desired to be performed by the manipulator. The jaw members shown are provided with an inner resilient face pad 415 to facilitate the handling of heavy objects by permitting a tight grip about them.

The jaws are maintained in normally open position by means of a pair of coil springs 416 in each of the compound links. One end of each of springs 416 is secured to an extension of inner link 406 extending into the space between the inner and outer links adjacent the jaw socket end of the links. The other end of each of coil springs 416 is secured to a spring anchor strap 418 which is pivotally mounted in the frame about pin 419. Each of outer links 404 encloses a pulley 420 journaled for rotation about a shaft 421. A pair of pulleys 422, journaled to rotate about shafts 423 in pulley block 424, is set into the frame body.

The ends of tong cable 107*a* extending from the slave arm wrist joint through the shank of bevel gear 99 pass first around pulleys 422 and thence around pulleys 420 and are anchored in a pair of cable terminals each pivotally attached to the tong body at 426.

As tension is exerted on cable 107*a*, as a result of the manipulation of the handle by the operator and the forces transmitted through the master arm, through the horizontal support and down through the slave arm, the jaws 413 are caused to closed inwardly toward one another. The tension of the cable 107*a* against its anchored terminal causes rotation of pulley 420 and pivotal movement of links 404 and 406 against the pressure of spring 416 and corresponding pivotal movement of the jaw sockets relative to the links. The result is a two-fold force increase. Similar increase in force may be accomplished by other force multiplier means, such as gearing, etc.

TONG MOTION

(*FIGURE 17*)

Figures 17, 25:
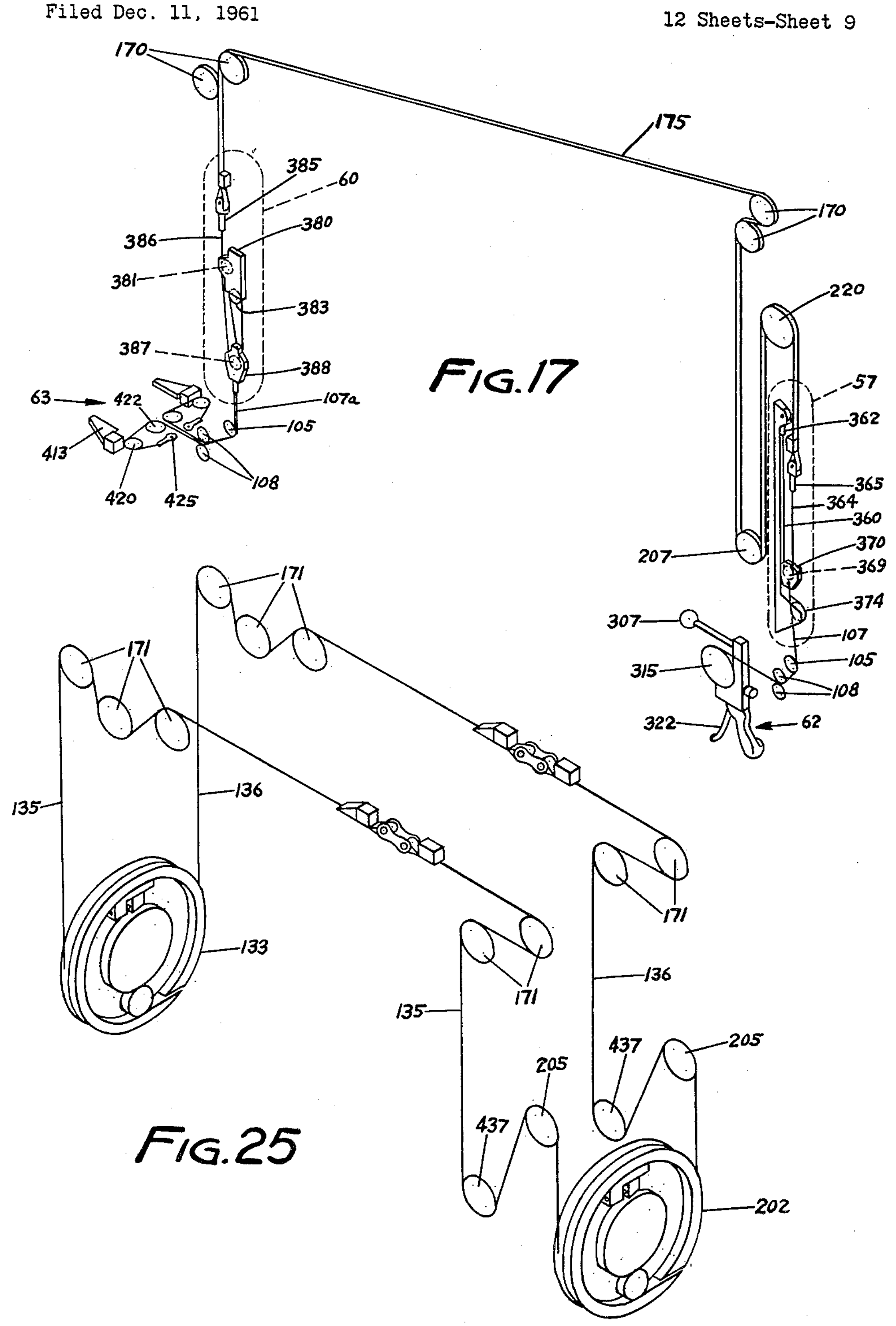
FIGURE 17 is a schematic perspective view showing how the manipulation of the grip or handle assembly on the master arm causes opening and closing of the tong assembly on the slave arm with multiplied squeeze force.
FIGURE 25 is a schematic perspective view of the azimuth motion components showing how rotation of the master arm about a longitudinal axis produces rotation of the slave arm about its longitudinal axis.
Figures 18, 19:
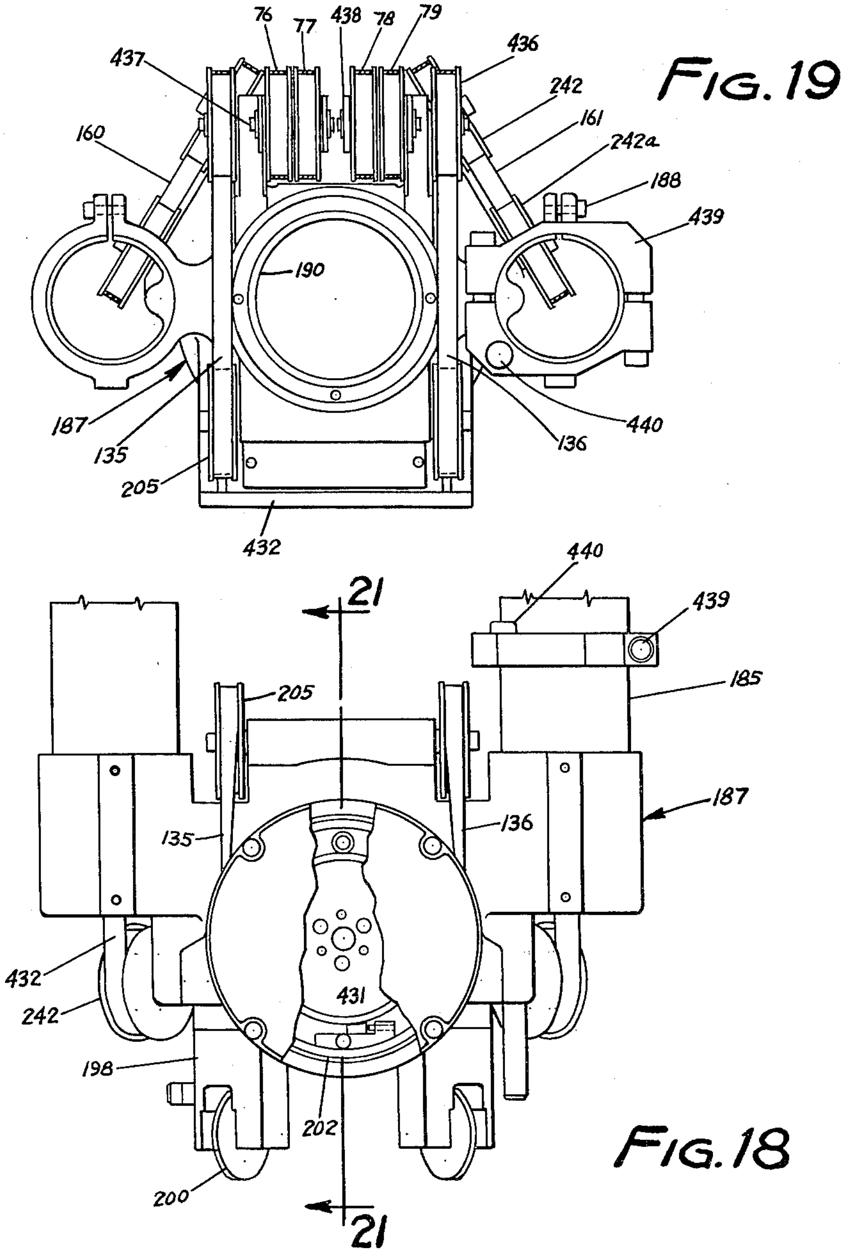
FIGURE 18 is a front elevation, partly in section and partly broken away, of a modified rugged-duty master arm azimuth assembly.
FIGURE 19 is a top plan view of the azimuth assembly.
Figures 20, 21, 22:
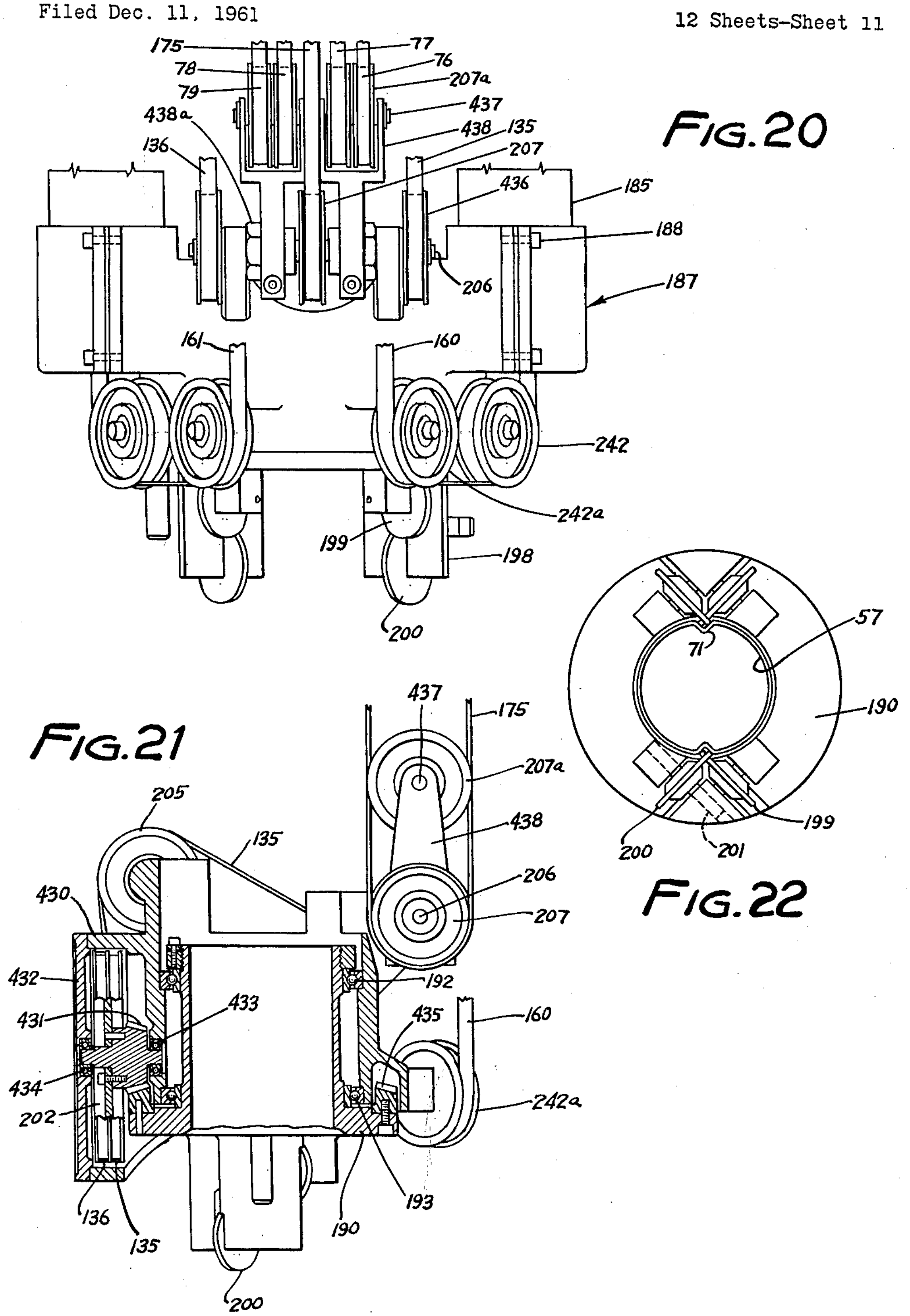
FIGURE 20 is a rear elevation of the azimuth assembly.
FIGURE 21 is a vertical section on the line 21—21 of FIGURE 18 and in the direction of the arrows.
FIGURE 22 is a fragmentary bottom plan view, partly in section, of the azimuth assembly.

FIGURE 17 shows a schematic perspective representation of the means by which the motions of the handle means are transmitted and the forces are first reduced and then multiplied in order to provide corresponding motion of increased force in the tongs at the end of the slave arm of the manipulator without transmitting high forces through the entire manipulator. Movement of the finger lever 322 of the handle means toward the hand grip causes counterclockwise rotation of tong cable pulley 315, as viewed in this figure, as heretofore described. Rotation of pulley 315 causes cable 107 to be wrapped further about the pulley. The tension thus exerted on cable 107 is transmitted through the length of the cable in its passage between guide pulleys 108 and around guide pulleys 105 and 374 to pulley block 370 in the master arm squeeze multiplier assembly, to which the opposite end of cable 107 is attached. The tension on cable 107 tends to pull the pulley block 370 downwardly. This exerts tension, through means of pulley 369, upon cable 364. One end of cable 364 is fixed. The other end, after passage around pulley 369, is connected to tape 175. Accordingly, as the tension on cable 107 causes the pulley block 370 to move downwardly the tension transmitted through cable 364 causes tape 175 to move twice the distance in the same time, but at one-half the force.

As is readily understood, particularly by reference to the aforesaid Goertz et al. patent, tape 175 passes over guide pulley 220 at the top of the master arm boom tube, around guide pulley 207 at the bottom of the master arm trunk tube, around guide pulleys 170 at the top of the master arm trunk tube, through the horizontal support to similar guide pulleys 170 at the top of the slave arm trunk tube. The slave arm end of the tape 175 is connected to cable 386 which passes around guide pulley 381, around pulley 387 in pulley block 388, around guide pulley 383 and is secured to the pulley block 388. Thus, tension transmitted through the tape 175 is in turn transmitted to cable 386 and through the cable to the pulley block 388. Because of the arrangement of pulleys 381, 383 and 387, the pulley block 388 is caused to move one-third the distance with three times the force in the same period of time as tape 175 is caused to move. Pulley block 388 is in turn connected to one end of dual cables 107*a* which pass around guide pulley 105 and pulleys 108 in the wrist joint and around guide pulleys 422 and 420 in the tong assembly to terminals 425 which are secured to the tong assembly. Thus, as tension is exerted on cables 107*a* the jaws 413 are caused to close inwardly toward one another to grasp an article to be handled. Because of the squeeze multiplier assemblies included in both the master arm and slave arm of the manipulator, any force exerted by the operator on the finger lever of the handle means results in initial increased travel movement of the transmitting tape and cables and decreased force in the master arm and decreased travel movement and resultant increased force exerted by the tong assembly at the end of the slave arm. Because of reduced stretch in the tape a stiffer and more rigid system results.

MASTER AZIMUTH ASSEMBLY

(*FIGURES 18 to 22*)

As shown in FIGURES 18 to 22, a bracket 187 is secured to the lower ends of the tubular guides 185 which comprise part of the master arm trunk tube by means of clamping screws 188. A ring or rotating body 190 is rotatably mounted in a central portion of the bracket 187 by means of an upper bearing 192 and a lower bearing 193. The rotary body 190 has two axial extensions 198, each of which carries rollers 199 and 200 each mounted on a shaft 201. On each extension 198 the rollers 199 and 200 extend at right angles to one another and engage the sides of the grooves 71 formed in the master arm boom tube 57. Thus, the rollers 199 and 200 constitute keys that permit axial movement of the master arm boom tube with respect to the rotary body 190 while preventing rotational movement of the boom tube with respect to the rotating body.

The azimuth assembly includes a tape take-up portion in the form of a double grooved pulley 202 housed in a recess 430 in the portion of bracket 187 facing the operator. The double grooved pulley is secured to the shank of a bevel gear 431 which is journaled for rotation between the bracket wall and a cover plate 432 by means of bearings 433 and 434, respectively. Bevel gear 431 meshes with a beveled ring gear 435 secured to an outwardly projecting flange of the rotating body 190. The ends of azimuth motion tapes 135 and 136 are received in the grooves of the double grooved take-up pulley 202. The tapes extend around the pulley in opposite direction and then extend over grooved guide pulleys 205, around guide pulleys 436 and, thence, upward toward pivot 58 of the master arm on the horizontal support.

The elevation and twist motion tapes 76, 77, 78 and 79 from the master arm wrist joint run over pulleys 207*a* which are journaled to rotate on shafts 437 mounted in bifurcated brackets 438 which in turn are mounted on stationary shaft 206. Brackets 438 are tightly secured to an eccentric bushing 438*a*. This eccentric mounting of pulleys 207*a* permits easy adjustment of tape tensions in the paths of the tapes in their course upwardly toward the master arm pivot. Guide pulleys 242 and 242*a* are journaled for rotation in the lower end of azimuth bracket 187 for the purpose of receiving counterweight tapes 160 and 161 in their paths downwardly through tubular members 185 and guide these tapes upwardly to the guide pulleys at the pivot 58 at the top of the master arm.

SLAVE AZIMUTH ASSEMBLY

Figure 23:
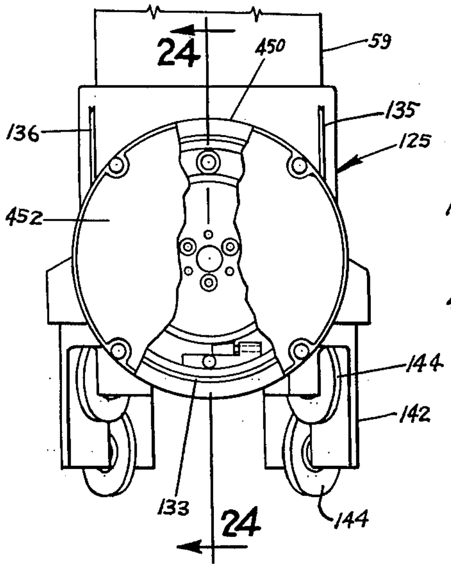
FIGURE 23 is a front elevation from the remote area of a rugged-duty slave arm azimuth assembly, shown with tape shield removed.
Figure 24:
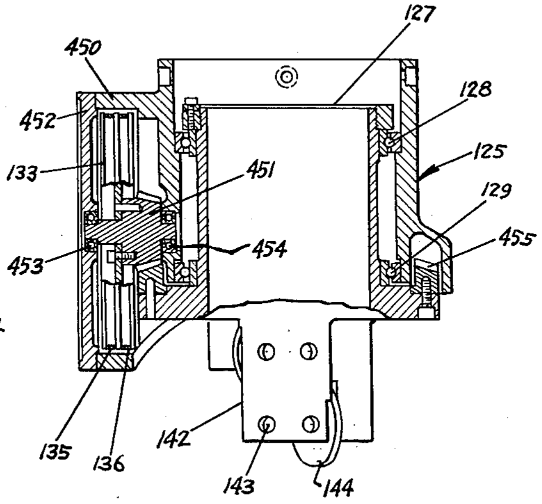
FIGURE 24 is a section on the line 24—24 of FIGURE 23 and in the direction of the arrows.

(*FIGURES 23 and 24*)

As shown in FIGURES 23 and 24, a slave azimuth body in the form of a bracket 125 is secured to the lower end of the slave trunk tube 59. A rotating body or ring 127 is rotatably mounted within the bracket 125 by means of an upper bearing 128 and a lower bearing 129. The lower end of the ring 127 has two diametrically opposed axial extensions 142 which provide mountings for four shafts 143 which carry four rollers 144. The rollers 144 have axes lying in planes normal to the axis of the slave arm boom tube 60 and engage the sides of the grooves formed in the tube, as described in connection with the similar rollers of the master arm azimuth assembly and master arm boom tube. For each groove one roller 144 engages one side of the groove and the other roller 144 on the same extension 142 engages the other side of the same groove, the two rollers lying in planes generally perpendicular to one another. The rollers 144 constitute a means for keying the slave arm boom tube to the ring 127 whereby a rotational movement of the boom tube 60 with respect to the ring 127 is prevented while axial movement of the boom tube with respect to the ring is permitted.

The slave azimuth body is provided with a tape take-up member in the form of a double grooved pulley 133 which receives azimuth motion tapes 135 and 136 whose ends are secured by anchoring to the pulley and whose opposite ends extend to the master azimuth assembly. Pulley 133 is housed in a recess 450 formed in the azimuth body. The pulley is mounted on the shank of a bevel gear 451. Bevel gear 451 is journaled for rotation between the azimuth body and cover plate 432 for the recess 450 in bearings 453 and 454, respectively. The teeth of bevel gear 451 mesh with the teeth of a beveled ring gear 455 mounted on an outwardly extending flange at the bottom end of rotary ring member 127.

Tapes 135 and 136 are wrapped around the double grooved pulley in opposite directions. As one tape is wrapped about the pulley the other is unwrapped. This movement of the tapes causes rotation of the bevel gear 451 which causes corresponding rotation of ring gear 455 and the rotary ring member 127 and, through the keying rollers 144, causes rotation of the slave arm boom tube and the wrist joint and tong assemblies at the end thereof. Tapes 135 and 136 are moved in response to corresponding movement of the master arm azimuth assembly and transmit the rotary motion of the master arm about its longitudinal axis to produce a corresponding rotation of the slave arm about its longitudinal axis.

AZIMUTH MOTION

*(FIGURE 25)*

In FIGURE 25 there is shown schematically the manner in which rotation of the master arm boom tube about its longitudinal axis causes corresponding rotation of the slave arm boom tube. As the handle member 62 is moved in an arc about the longitudinal axis of the master arm this motion is transmitted through the wrist joint to the master arm boom tube 57. Because the master arm boom tube 57 is keyed against rotation relative to the ring 190 of the master azimuth assembly by virtue of the keying rollers 199, rotation of the master arm boom tube causes corresponding rotation of the ring 190 which carries ring gear 435.

Rotation of the ring gear causes rotation of the bevel gear 431 and the double grooved pulley 202. The tapes 135 and 136 are wrapped about that pulley in opposite directions. Thus as pulley 202 is rotated in a clockwise direction, as viewed by the operator, tension is exerted on tape 136 as it is caused to wind farther onto the pulley. This tension is transmitted by the tape in its path up and over guide pulley 205, around guide pulley 437, up and around guide pulley 171 at the upper end of the master arm, through the horizontal support, around the corresponding guide pulley 171 at the upper end of the slave arm and down to double grooved pulley 133 of the slave azimuth assembly where the tension on the tape causes rotation of the pulley.

The rotation of the double grooved pulley 133 is in a counterclockwise direction, as viewed by the operator, and, thus, causes an unwinding of tape 136 from double grooved pulley 133. This causes a corresponding winding of tape 135 about the pulley which exerts tension on that tape which is transmitted along the tape in its path up the slave arm, around the guide pulleys, through the horizontal support, around the guide pulleys and down to the master azimuth assembly where the opposite end of the tape is unwound the corresponding amount from the double grooved pulley 202.

The rotation of pulley 133 causes corresponding rotation of bevel gear 451 and ring gear 455 which, as already explained, causes rotation of the slave azimuth ring member 127 and slave arm boom tube 60. The modified forms of master and slave azimuth assemblies according to the present invention permit the use of tapes to transmit the azimuth motions instead of cables as heretofore used for this purpose. Results are a decrease in friction and added rigidity.

LATERAL ROTATION

*(FIGURES 1 and 2)*

Figure 2:
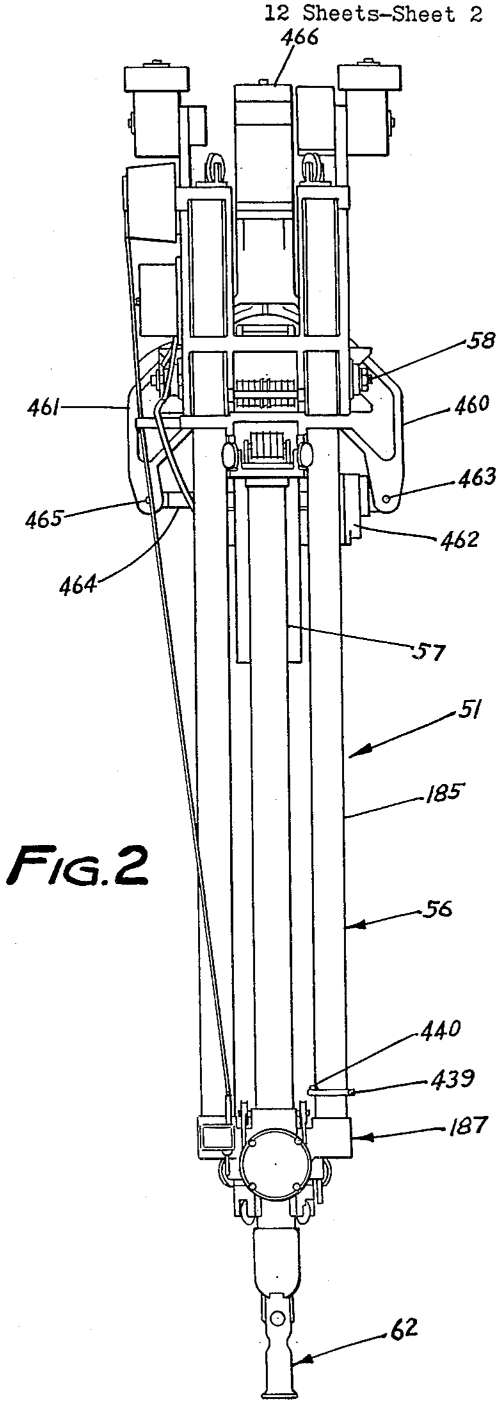
FIGURE 2 is a front elevation (from the viewpoint of the operator) of the master arm of the manipulator.
Figure 4:
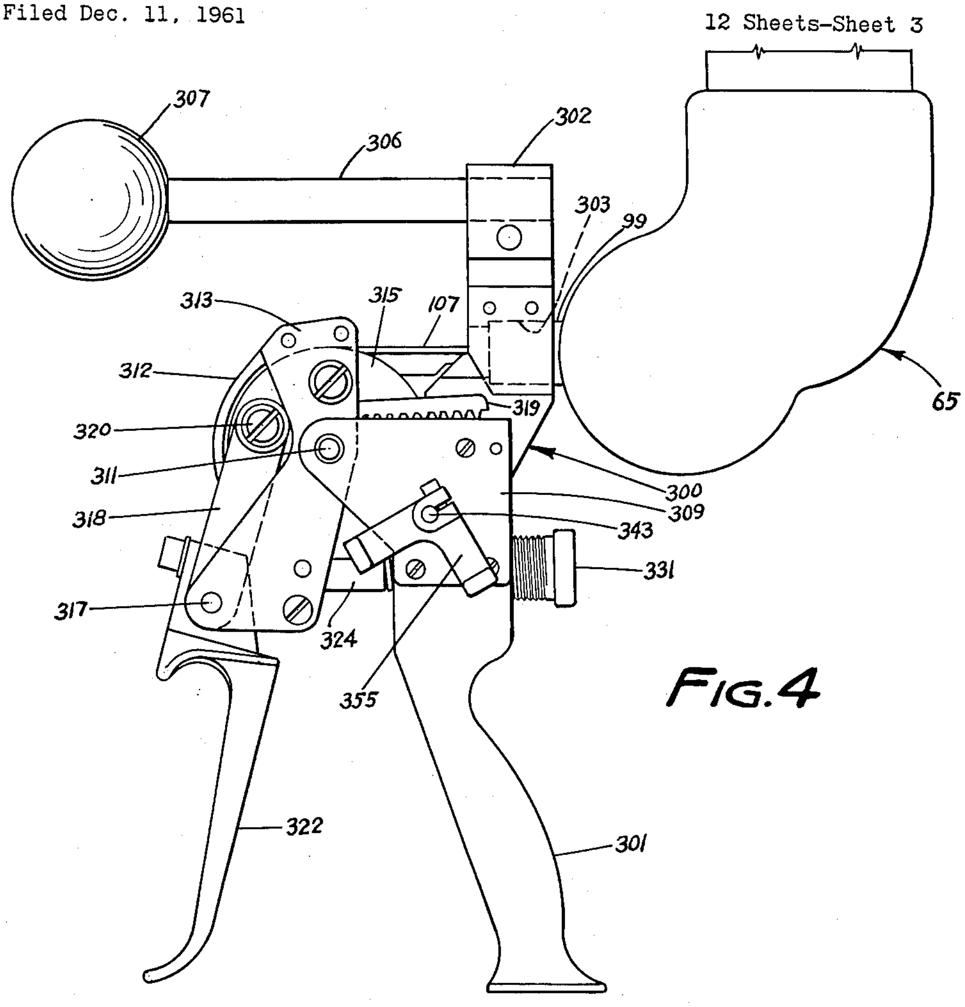
FIGURE 4 is a lefthand elevation on an enlarged scale of the automatically shiftable grip or handle means.
Figure 5:
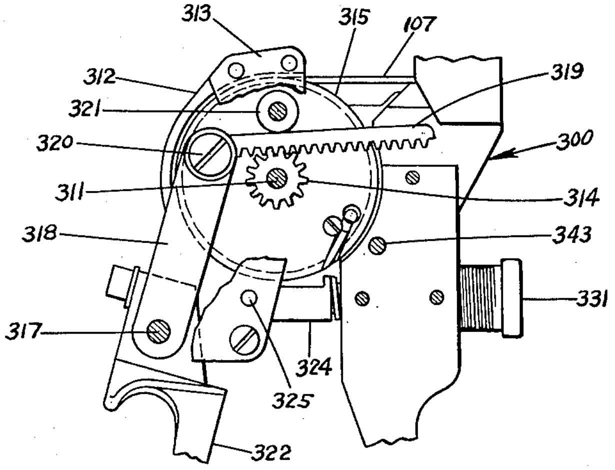
FIGURE 5 is a similar fragmentary view with parts broken away to show interior handle mechanism.
Figures 6, 7:
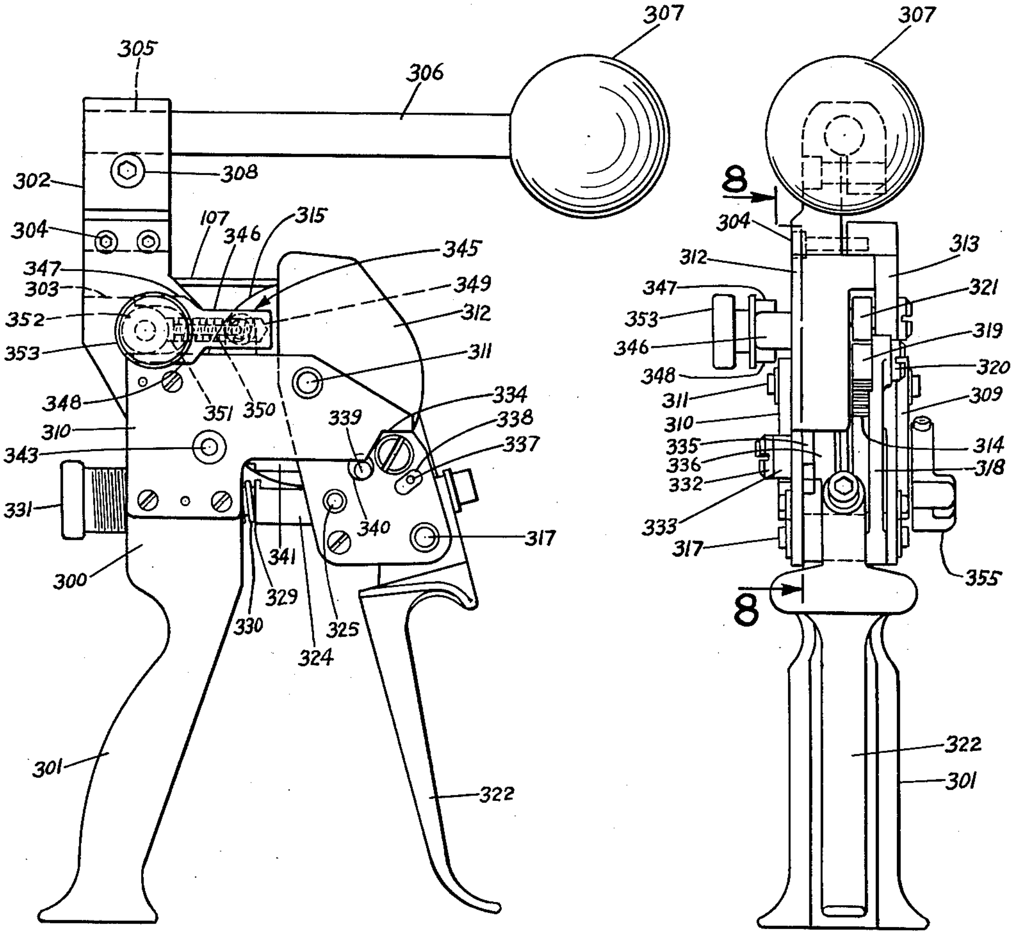
FIGURE 6 is a right hand elevation of the handle.
FIGURE 7 is a rear elevation of the handle.
Figure 8:
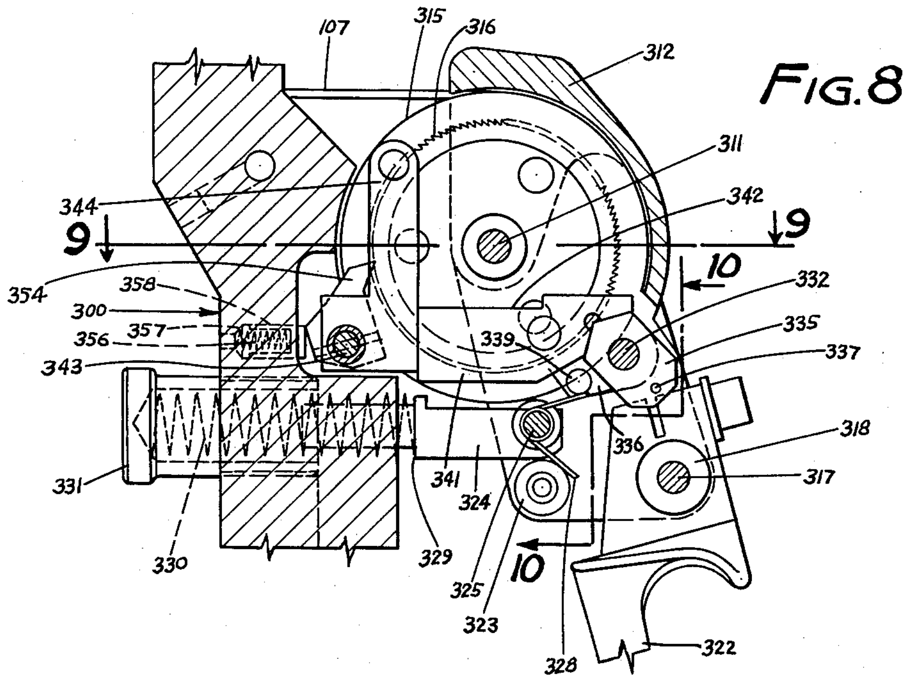
FIGURE 8 is a fragmentary vertical section on an enlarged scale on the line 8—8 of FIGURE 7 and in the direction of the arrows.
Figure 9:
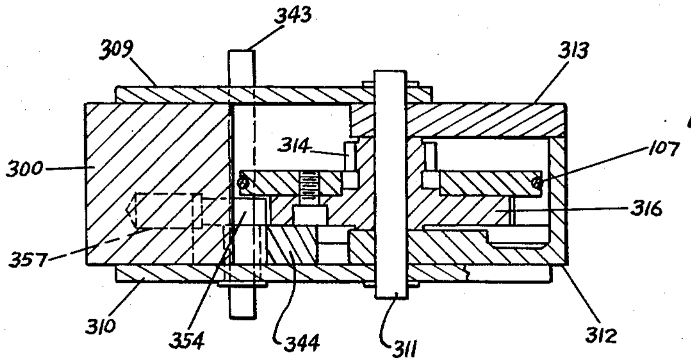
FIGURE 9 is a fragmentary horizontal section on the line 9—9 of FIGURE 8 and in the direction of the arrows.
Figure 10:
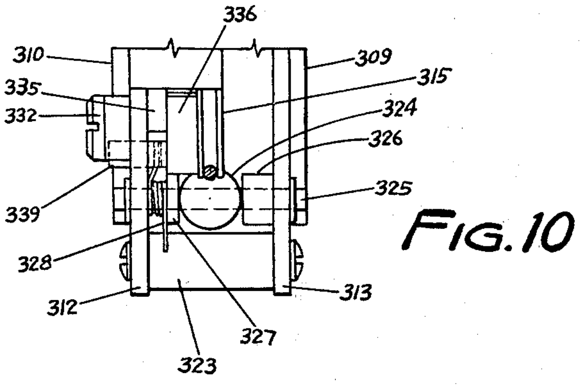
FIGURE 10 is a fragmentary sectional view on the line 10—10 of FIGURE 8 and in the direction of the arrows.

The rugged-duty manipulator of the present invention is adapted to rotate one arm of the manipulator laterally outside of the plane defined by the longitudinal axes of the other arm and the horizontal supporting structure in order to increase the effective range of usefulness of the manipulator. Several alternative means for accomplishing lateral rotation or side canting are described in U.S. Patent No. 2,888,154 issued to Jelatis et al. on May 26, 1959. As shown in FIGURES 1 and 2, lateral rotation of one arm is accomplished relative to the other arm by virtue of the fact that the through tube 50 is journaled in a collar or sleeve 459 which supports the pivot structure for the master arm.

One actuator arm 460 is rigidly secured to the through tube 50. Another actuator arm 461 is rigidly secured to the collar 459. Jack means, such as an electrical screw jack 462, is pivotally connected at 463 to one of the arms. The jack piston 464 is pivotally connected at 465 to the other of the actuator arms. One counterweight bracket 466 is secured to actuator arm 460 and another counterweight bracket 467 is secured to actuator arm 461. By actuation of the jack 462, the ends of the actuator arms 460 and 461 are brought closer together or moved farther apart to cause relative rotation between the through tube 50 and the pivot collar 459 with corresponding lateral movement of the slave arm with respect to the master arm.

As is well understood, traveling counterweights are provided within the tubular members 185 of the master arm to counterbalance relative longitudinal movement of the master arm boom tube with respect to the remainder of the master arm structure. A clamp 439 provided with a resilient bumper 440 provides a stop against which the carriage structure at the top of the master arm boom tube comes into contact to limit movement of the master arm boom tube. Also as is well understood, jack means are provided for canting the slave arm forward relative to the master arm to extend the reach of the slave arm and also to extend the slave arm horizontally in longitudinal alignment with the through tube 50 to permit the manipulator to be installed by passage of the slave arm through the tube 54 and to permit removal of the manipulator from the shielding wall. Convenient switch means are desirably mounted on the master azimuth assembly to permit the operator to readily control the lateral rotation and forward extension of the slave arm.

The slave arm is desirably provided with a tape shield in the form of an elongated channel housing extending along the length of the slave arm trunk tube, the side walls of the shield extending tangentially outwardly from the side edges of the trunk tube and the forward wall being spaced outwardly from the forward edge of the trunk tube.

The rugged-duty master-slave manipulator according to the present invention offers greatly increased reliability and scope in rough service operations with no significant loss of dexterity for performing delicate operations. The manipulator of the present invention is characterized by increased travel ratios in the wrist joint, elevation and twist, azimuth and tong motions. Among the benefits derived are increased rigidity in the system. This results in lower deflections for a given load which gives the operator better response and control over the manipulative motions and substantially decreases the possibility of out-of-phase motions between the slave and master arms.

The capabilities of the manipulator have been greatly increased, as compared with its forerunner. Exemplary load capacities at tong tips with fully extended boom tube are as follows: in the X, Y and Z motions, 100 lbs.; elevation rotation 50 lb. feet; azimuth rotation 50 lb. feet; twist rotation 40 lb. feet; and gripping force and handling capacity, 100 lbs.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A rugged-duty, remote control, master-slave manipulator comprising a horizontal supporting structure having a master arm connected adjacent one end thereof and a slave arm connected adjacent the other end thereof, a wrist joint adjacent the free end of said master arm and handle means projecting therefrom, a wrist joint adjacent the free end of said slave arm and tong means projecting therefrom, said tong means being operative through linear motion transmission elements in response to movement of said handle means and including clamping jaw members, said handle means including rotary take-up means to which one end of a linear tong motion transmission element controlling said jaw members is secured, said take-up means being rotatably mounted in a housing pivotally mounted in said handle, lever means movable in response to finger pressure of the manipulator operator pivotally mounted in said housing and operatively connected to rapidly rotate said take-up means relative to said housing, and means to lock said lever means against pivotal movement on its pivotal mounting whereby further movement of said lever means causes pivotal movement of said housing.

2. A manipulator according to claim 1 further characterized in that said take-up means is secured to rotate with a pinion gear and the operative connection between said lever means and take-up means is through a toothed member movable with said lever means whose teeth mesh with said pinion gear.

3. A manipulator according to claim 1 further characterized in that adjustable spring tension means is provided within said handle means to exert force upon said housing enclosing said take-up means, said means to lock said lever means against pivotal movement on its pivotal mounting engaging said lever means upon resistance encountered by the clamping jaws of said tong means in excess of the force exerted by said spring tension means.

4. A manipulator according to claim 1 further characterized in that said take-up means is secured to rotate with a ratchet wheel, and said housing enclosing said take-up means is provided with a pivotally mounted pawl adapted to engage said ratchet wheel upon engagement of said means to lock said lever means against pivotal movement on its pivotal mounting, whereby further movement of said lever means causes slower advancement of said take-up means with increased force.

5. A manipulator according to claim 1 further characterized in that said handle means includes a bracket, a stationary lever extending from said bracket and lying in a plane which bisects said handle means longitudinally, a control handle at the end of said stationary lever, said control handle being at least partially spherical, said control handle being spaced from said master arm wrist joint by substantially the same distance the center of the clamping jaw members of the tong means is spaced from said slave arm wrist joint.

6. A manipulator according to claim 1 further characterized in that each of said wrist joints includes a bevel gear, a pair of differential bevel gears mounted to rotate on trunnions extending from opposite sides of a yoke within the wrist joint housing, the teeth of said first bevel gear engaging the teeth of both of said differential bevel gears, a pair of spur gears mounted to rotate on said trunnions, each of said spur gears secured to one of said differential bevel gears to rotate therewith, a shaft supported between opposite side walls of the wrist joint housing, a pair of take-up means mounted to rotate on said shaft, each of said take-up means being adapted to receive a pair of linear motion transmission elements, a pair of further spur gears mounted to rotate on said shaft, each of said last named spur gears being secured to one of said take-up means to rotate therewith, a further shaft parallel to the first and supported between opposite side walls of the wrist joint housing spaced between said differential bevel gears and said take-up means, a pair of compound spur gears mounted for rotation with respect to said further shaft, one member of each of said compound spur gears which is of lesser diameter meshing with one of said first named spur gears rotatable with said differential bevel gears, and one member of each of said compound spur gears which is of greater diameter meshing with one of said further spur gears rotatable with said take-up means, whereby an increase in gear ratio is achieved.

7. A manipulator according to claim 1 further characterized in that linear tong motion force multiplier means is installed in at least one of said manipulator arms.

8. A manipulator according to claim 7 further characterized in that said force multiplier means is mounted in said master arm and comprises a bracket, means in said bracket for anchoring one end of the linear tong motion transmission element, a movable pulley means engaged by said linear motion transmission element in its path between said anchoring means and horizontal support, and a further linear tong motion transmission element connecting said movable pulley means through the master arm wrist joint to the take-up means of said handle means.

9. A manipulator according to claim 7 further characterized in that said force multiplier means is mounted in said slave arm and comprises a bracket, a stationary pulley in said bracket, a movable pulley means, means for anchoring one end of the linear tong motion transmission element to said movable pulley means, said linear motion transmission element in its path between said anchoring means and horizontal support first engaging said stationary pulley and then engaging said movable pulley, and a further linear tong motion transmission element connecting said movable pulley means through the slave arm wrist joint to the clamping jaws of said tong means.

10. A manipulator according to claim 1 further characterized in that said tong assembly includes a tong body, a pair of link means pivotally mounted in said body, a pair of clamping jaw receiving members each pivotally mounted on one of said pivotally mounted link means, a pair of guide pulleys mounted for rotation in said tong body, a second pair of guide pulleys each mounted for rotation in one of said pivotally mounted link means, a pair of anchoring means in said tong body adjacent said first pair of guide pulleys, said linear tong motion transmission element first engaging one of said first pair of guide pulleys and then engaging one of said second pair of guide pulleys in its path from said slave arm wrist joint to one of said anchoring means, whereby a two-fold force increase in said clamping jaws is achieved.

11. A manipulator according to claim 1 further characterized in that each of said master and slave arms includes a first portion which is stationary relative to longitudinal vertical movement and a second portion which is movable longitudinally relative to the first, azimuth bracket means mounted adjacent the free end of each of the stationary portions of said arms, ring means rotatably mounted within each of said brackets, each of said movable portions of said arms being positioned within one of said ring means for rotation therewith but movable longitudinally with respect thereto, a ring gear carried by each of said ring means for rotation in a plane normal to the longitudinal axis of the arm, a further gear carried in each of said azimuth brackets and meshing with said ring gear for rotation in a plane parallel to the longitudinal axis of the arm, a take-up means mounted for rotation with each of said further gears, each of said take-up means being adapted to receive a pair of linear azimuth motion transmission elements wrapped in opposite directions, whereby rotation of the handle means at the free end of the master arm in an arc about the longitudinal axis of that arm causes winding of one of said linear azimuth motion transmission elements about the take-up means of the master azimuth bracket and corresponding unwinding of the other element to cause unwinding and winding of the same elements at the take-up means of the slave azimuth bracket to transmit the motion to the tong means at the free end of the slave arm.

12. A rugged-duty, remote control, master-slave manipulator comprising a horizontal supporting structure having a master arm connected adjacent one end thereof and a slave arm connected adjacent the other end thereof, a wrist joint adjacent the free end of said master arm and handle means projecting therefrom, a wrist joint adjacent the free end of the slave arm and tong means projecting therefrom, said tong means being operative in response to movement of said handle means and including clamping jaw members, said handle means including a bracket, a stationary lever extending from said bracket and lying substantially in a plane which bisects said handle means longitudinally, a control handle at the end of said lever, said control handle being at least partially spherical, said control handle being spaced from said master arm wrist joint by substantially the same distance the center of the clamping jaw members of the tong means is spaced from said slave arm wrist joint.

13. A rugged-duty, remote control, master slave manipulator comprising a horizontal supporting structure having a master arm connected adjacent one end thereof and a slave arm connected adjacent the other end thereof, a wrist joint adjacent the free end of said master arm and handle means projecting therefrom, a wrist joint adjacent the free end of the slave arm and tong means projecting therefrom, said tong means being operative through linear motion transmission elements in response to movement of said handle means, each of said wrist joints including a bevel gear, a pair of differential bevel gears mounted to rotate on trunnions extending from opposite sides of a yoke within the wrist joint housing, the teeth of said first bevel gear engaging the teeth of both of said differential bevel gears, a pair of spur gears mounted to rotate on said trunnions, each of said spur gears secured to one of said differential bevel gears to rotate therewith, a shaft supported between opposite side walls of said wrist joint housing, a pair of take-up means mounted to rotate on said shaft, each of said take-up means being adapted to receive a pair of linear motion transmission elements, a pair of further spur gears mounted to rotate on said shaft, each of said last named spur gears being secured to one of said take-up means to rotate therewith, a further shaft parallel to the first and supported between opposite side walls of the wrist joint housing spaced between said differential bevel gears and said take-up means, a pair of compound spur gears mounted for rotation with respect to said further shaft, one member of each of said compound spur gears which is of lesser diameter meshing with one of said first named spur gears rotatable with said differential bevel gears, and one member of each of said compound spur gears which is of greater diameter meshing with one of said further spur gears rotatable with said take-up means, whereby an increase in gear ratio is achieved.

14. A rugged-duty, remote control, master-slave manipulator comprising a horizontal supporting structure having a master arm connected adjacent one end thereof and a slave arm connected adjacent the other end thereof, a wrist joint adjacent the free end of said master arm and handle means projecting therefrom, a wrist joint adjacent the free end of said slave arm and tong means projecting therefrom, said tong means being operative through linear motion transmission elements in response to movement of said handle means, said tong means including clamping jaw members operative through linear tong motion transmission elements, linear tong motion force multiplier means in each of said manipulators arms, the force multiplier mounted in said master arm including a bracket, means in said bracket for anchoring one end of the linear tong motion transmission element, a movable pulley means engaged by said linear motion transmission element in its path between said anchoring means and horizontal support, and a further linear tong motion transmission element connecting said movable pulley means through the master arm wrist joint to take-up means within said handle means; the force arm multiplier means mounted in said slave arm including a bracket, a stationary pulley in said bracket, a movable pulley means, means for anchoring the opposite end of said first named linear tong motion transmission element to said movable pulley means, said linear motion transmission means in its path between said anchoring means and horizontal support first engaging said stationary pulley and then engaging said movable pulley, and a further linear tong motion transmission element connecting said movable pulley means through the slave arm wrist joint to the clamping jaws of said tong means.

15. A rugged-duty, remote control, master-slave manipulator comprising a horizontal supporting structure having a master arm connected adjacent one end thereof and a slave arm connected adjacent the other end thereof, a wrist joint adjacent the free end of said master arm and handle means projecting therefrom, a wrist joint adjacent the free end of said slave arm and tong means projecting therefrom, said tong means being operative through linear motion transmission elements in response to movement of said handle means and including clamping jaw members movable through a linear tong motion transmission element, said tong assembly including a tong body, a pair of link means pivotally mounted in said body on opposite sides thereof, a pair of clamping jaw receiving members each pivotally mounted on one of said pivotally mounted link means, a pair of guide pulleys mounted for rotation centrally within said tong body, a second pair of guide pulleys each mounted for rotation in one of said pivotally mounted link means, a pair of anchoring means in said tong body adjacent said first pair of guide pulleys, said linear tong motion transmission element first engaging one of said first pair of guide pulleys and then engaging one of said second pair of guide pulleys in its path from said slave arm wrist joint to one of said anchoring means, whereby a two-fold force increase in said clamping jaws is achieved.

16. A rugged-duty, remote control, master-slave manipulator comprising a horizontal supporting structure having a master arm connected adjacent one end thereof and a slave arm connected adjacent the other end thereof, a wrist joint adjacent the free end of the master arm and handle means projecting therefrom, a wrist joint adjacent the free end of said slave arm and tong means projecting therefrom, said tong means being operative through linear motion transmission elements in response to movement of said handle means, each of said master and slave arms including a first portion which is stationary relative to longitudinal vertical movement and a second portion which is movable longitudinally relative to the first, azimuth bracket means mounted adjacent the free end of each of the stationary portions of said arms, ring means rotatably mounted within each of said brackets, each of said movable portions of said arms being positioned within one of said ring means for rotation therewith but movable longitudinally with respect thereto, a ring gear carried by each of said ring means for rotation in a plane normal to the longitudinal axis of the arm, a further gear carried in each of said azimuth brackets and meshing with said ring gear for rotation in a plane parallel to the longitudinal axis of the arm, a take-up means mounted for rotation with each of said further gears, each of said take-up means being adapted to receive a pair of linear azimuth motion transmission elements wrapped in opposite directions, whereby rotation of the handle means at the free end of the master arm in an arc about the longitudinal axis of that arm causes winding of one of said linear azimuth motion transmission elements about the take-up means of the master azimuth bracket and corresponding unwinding of the other element to cause unwinding and winding of the same elements at the take-up means of the slave azimuth bracket to transmit the motion to the tong means at the free end of the slave arm.

17. A rugged-duty, remote control, master-slave manipulator comprising a horizontal supporting structure having a master arm connected adjacent one end thereof and a slave arm connected adjacent the other end thereof, a wrist joint adjacent the free end of said master arm and automatically shifting, multi-ratio handle means projecting therefrom, a wrist joint adjacent the free end of said slave arm and tong means projecting therefrom, said tong means being operative through linear motion transmission elements in response to movement of said handle means and including clamping jaw members, said handle means including rotary take-up means to which one end of a linear tong motion transmission element controlling said jaw members is secured, manual means movable in response to hand movement of the manipulator operator operatively connected to rotate said take-up means, ratio shifting means operatively associated with said take-up means and manual means, said ratio shifting means being adapted to automatically shift the ratio of rotation of said take-up means relative to the rate of movement of said manual means, said ratio shifting means being operative in response to the load force exerted at said tong means, said ratio shifting means being operative independently of the operating positions of said tong means and handle means.

18. A rugged-duty, remote control, master-slave manipulator comprising a horizontal supporting structure having a master arm connected adjacent one end thereof and a slave arm connected adjacent the other end thereof, a wrist joint adjacent the free end of said master arm and handle means projecting therefrom, a wrist joint adjacent the free end of said slave arm and tong means projecting therefrom, said tong means being operative through linear motion transmission elements in response to movement of said handle means, said tong means including clamping jaw members operative through linear tong motion transmission elements; linear tong motion force multiplier means in each of said manipulator arms, the force multiplier means in said master arm including means interconnecting a linear tong motion transmission element extending from said handle means through the master arm wrist joint with one end of a linear tong motion transmission element extending through said horizontal support to the slave arm, said interconnecting means being adapted to increase the rate of travel of said linear tong motion transmission element extending through the horizontal support relative to the rate of travel of said linear tong motion transmission element from said handle means while decreasing the force transmitted thereby; the force multiplier means in said slave arm including means interconnecting a linear tong motion transmission element extending from the clamping jaws of said tong means through the slave arm wrist joint with the opposite end of said linear tong motion transmission element extending through the horizontal support from the master arm, said interconnecting means being adapted to decrease the rate of travel of said linear tong motion transmission element from said tong means relative to the rate of travel of said linear tong motion element extending through the horizontal support from the master arm while increasing the force transmitted thereby.

References Cited in the file of this patent

UNITED STATES PATENTS

| | | |
|---|---|---|
| 1,300,477 | O'Connor | Apr. 15, 1919 |
| 2,764,301 | Goertz et al. | Sept. 25, 1956 |
| 2,994,554 | Harry | Aug. 1, 1961 |
| 3,039,322 | Powrie | June 19, 1962 |

FOREIGN PATENTS

| | | |
|---|---|---|
| 825,552 | Great Britain | Dec. 16, 1959 |

OTHER REFERENCES 1,079,301 German Printed Application Apr. 7, 1960